United States Patent [19]

Kobayashi et al.

[11] Patent Number: 5,504,930
[45] Date of Patent: Apr. 2, 1996

[54] PROGRAMMABLE CONTROLLER AND SEQUENCE CONTROL METHOD

[75] Inventors: Mitsuaki Kobayashi; Toshihiko Matsuda; Yasuo Morooka; Kunihiko Onuma, all of Hitachi; Noboru Azusawa, Katsuta; Hiromitsu Kikuchi, Hitachi, all of Japan

[73] Assignee: Hitachi, Ltd., Tokyo, Japan

[21] Appl. No.: 441,646

[22] Filed: May 15, 1995

Related U.S. Application Data

[63] Continuation of Ser. No. 965,450, Oct. 23, 1992, abandoned.

[30] Foreign Application Priority Data

Oct. 24, 1991 [JP] Japan ................. 3-277447

[51] Int. Cl.[6] .................................. G05B 19/414
[52] U.S. Cl. ................ 395/800; 395/375; 395/728
[58] Field of Search .................. 395/800, 325, 395/425, 200, 375, 725; 364/140

[56] References Cited

U.S. PATENT DOCUMENTS

| | | | |
|---|---|---|---|
| 4,249,248 | 2/1981 | Yomogida et al. | 364/900 |
| 4,592,010 | 5/1986 | Wollscheid | 395/800 |
| 4,627,025 | 12/1986 | Ninnemann et al. | 395/800 |
| 4,648,068 | 1/1987 | Ninnemann et al. | 395/325 |
| 5,121,490 | 6/1992 | Ueda | 395/425 |

FOREIGN PATENT DOCUMENTS

| | | |
|---|---|---|
| 0174231 | 3/1986 | European Pat. Off. . |
| 0422246 | 4/1991 | European Pat. Off. . |
| 2312061 | 12/1976 | France . |
| 2644912 | 9/1990 | France . |
| 2646254 | 10/1990 | France . |
| 63-172343 | 7/1988 | Japan . |
| 2249006 | 10/1990 | Japan . |
| 3196204 | 8/1991 | Japan . |

*Primary Examiner*—Kevin J. Teska
*Assistant Examiner*—Dan Fiul
*Attorney, Agent, or Firm*—Antonelli, Terry, Stout & Kraus

[57] ABSTRACT

A programmable controller for executing a program having mixed instructions. The programmable controller includes a bit operation memory for storing a mixed instruction inclusive of the mixture of bit operation instructions and word operation instructions in order of execution and a word operation memory for storing the word operation instructions in the mixed instruction in order of execution. A bit operation processor is provided in the programmable controller for outputting a start command for a word operation instruction when a word operation instruction read from the bit operation memory subsequently to the execution of the bit operation instruction has been recognized. The programmable controller also provides a microprocessor for receiving the word operation start command to execute the word operation instruction stored in the word operation memory,

12 Claims, 12 Drawing Sheets

FORMAT OF BIT OPERATION INSTRUCTION (B:BIT)

| B | INST | PARA |
|---|------|------|

FIG. 5(B)

FORMAT OF WORD OPERATION (W:WORD)

| W | INST | INST No. | PARA CONT |
|---|------|----------|-----------|
| PARA 1 ||||
| PARA 2 ||||
| PARA 3 ||||
| PARA 4 ||||

PROGRAMMABLE CONTROLLER AND SEQUENCE CONTROL METHOD

This application is a continuation of application Ser. No. 07/965,450, filed on Oct. 23, 1992, now abandoned.

BACKGROUND OF THE INVENTION

The present invention relates to a programmable controller, and more particularly to a programmable controller and a sequence control method in which a program including a bit operation (or logical operation) instruction and a word operation (or numerical operation) in a mixed form is executed.

In recent years, a control by a programmable controller is complicated and a sequence control usually includes a PID control therein. Therefore, a control program of the programmable controller includes a bit operation instruction (also called a sequence instruction or a ladder instruction) in a mixed form.

A programmable controller which executes a mixed instruction is known as disclosed by JP-A-56-105505. Such a programmable controller has two instruction execution portions including a dedicated bit operation circuit in a hardware form for executing a bit operation instruction and a dedicated word operation circuit for executing a word operation instruction on the basis of a microprogram. The dedicated word operation circuit executes the word operation instruction it only updates a program number of an instruction to be next executed when a sequence instruction is received.

There is also known a programmable controller, as disclosed by JP-A-61-48001, that is provided with a general purpose microprocessor unit (MPU) for processing of a bit operation instruction. A switching between a dedicated bit operation processor and the MPU is made by a switching instruction inserted at a partition between a bit operation instruction and the word operation instruction. During execution of bit operation, the MPU executes a dummy instruction to step a program.

The above-mentioned conventional programmable controller using the dedicated hardware allows a high-speed processing since a switching between bit operation and word operation becomes unnecessary. However, the development of the hardware requires a long time and the cost is high. Also, the reproduction of the hardware becomes necessary when a word operation instruction is added or changed.

On the other hand, the conventional programmable controller using a general purpose processor is low in cost and can flexibly cope with changes. However, overhead attendant upon the switching between instructions lowers the processing speed of the controller and hence a real-time processing for a complicated object to be controlled encounters some difficulty.

SUMMARY OF THE INVENTION

An object of the present invention is to solve the above problems of the prior art or to provide a programmable controller which allows a high-speed processing by reducing the overhead in the case where a general purpose processor is used.

Another object of the present invention is to realize a real-time control in a complicated sequence control including a word operation in a mixed form, thereby improving the accuracy of control.

A programmable controller according to the present invention includes a bit operation processor unit (SPU) for executing bit operation instructions, a general purpose microprocessor unit (MPU) for executing word operation instructions, a bit operation memory for storing a mixed instruction inclusive of a mixture of bit operation and word operation in order of execution, and a word operation memory for storing word operation instructions. The SPU is provided with switching means (or a coprocessor interface register (CIR)) for delivering a start command for a word operation instruction to the MPU in a stopped condition when the SPU recognizes the word operation instruction during execution of the bit operation instruction.

According to a feature of another aspect of the present invention, a prefetch type MPU is used as the general purpose MPU. The prefetch type general purpose MPU prefetches the next instruction from the word operation memory in parallel with the execution of a word operation instruction. When the SPU is in an executing condition, the MPU is brought into a stopped condition.

According to a feature of a further aspect of the present invention, a parameter control register for fixing a transfer address when seen from an MPU is provided in an SPU to index-modify a transfer address included in a word operation branch instruction.

According to the present invention, when the bit operation processor which exclusively executes a bit operation instruction based on a ladder instruction language recognizes a word operation branch instruction during execution of bit operation instruction, the CIR of the bit operation processor outputs the recognized word operation branch instruction after conversion thereof into a word operation start command based on a general purpose computer language. The general purpose MPU is activated by the start command to start word operation. Thereby, it is possible to reduce the overhead upon switching which is the disadvantage when a general purpose MPU is used.

The MPU prefetches an instruction to be executed but is brought into a stopped condition when the SPU is in an executing condition. Thereby, useless prefetch and discarded prefetch are prevented. When switching into the MPU is made, the execution of a word operation instruction prefetched is immediately started. Thereby, a high-speed processing becomes possible.

Since an address parameter of the word operation branch instruction is index-modified on the SPU side, a transmit address of the MPU is fixed and the time wasted for address take-in is eliminated.

Thus, according to the present invention, since a high-speed processing equivalent to that of the dedicated hardware even if the general purpose MPU is used, a real-time control becomes possible. Also, it is possible to provide a programmable controller which is easy in design/change of the system and is low in cost.

DESCRIPTION OF THE PREFERRED EMBODIMENTS

Embodiments of the present invention will now be explained in reference to FIGS. 1 to 11. Throughout the figures, the same reference numeral designates identical or similar components.

Figure 3A:
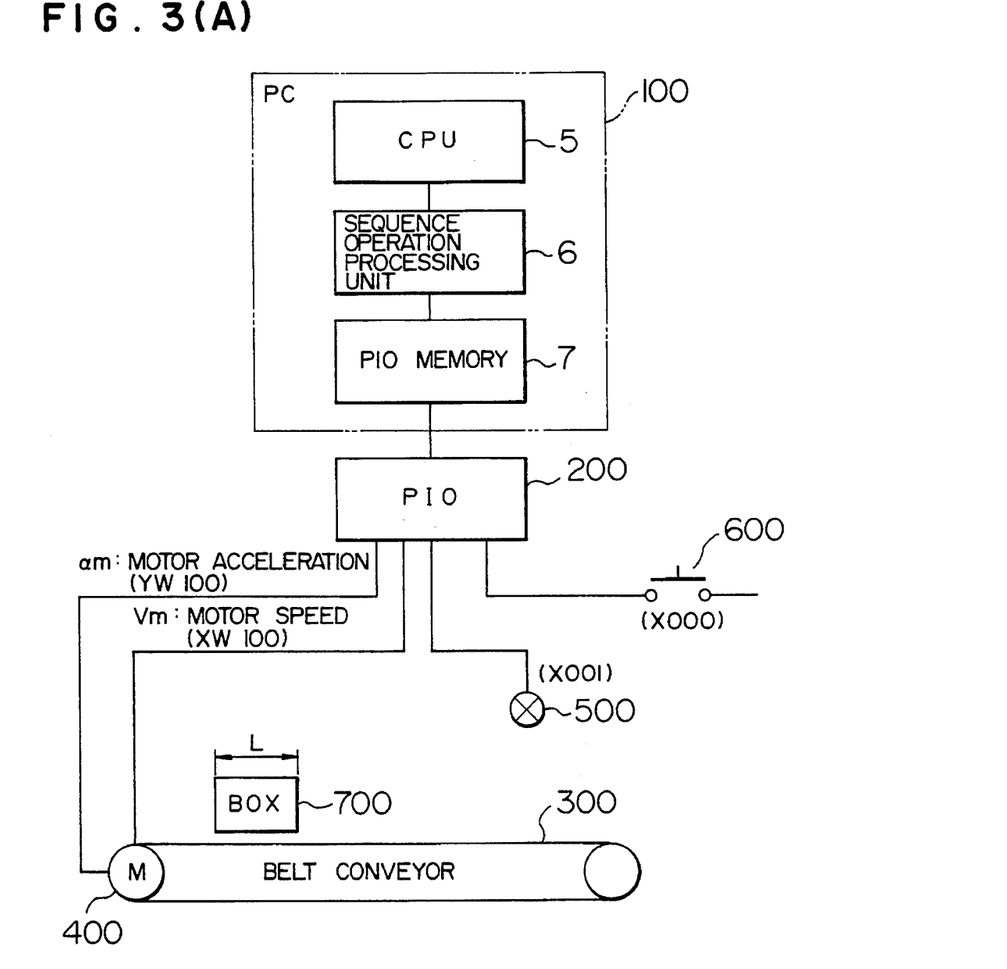
FIG. 3(A) is a conceptual diagram illustrating an object to which the present invention is applied.

FIG. 3(A) shows a system for making a control for conveyance of a box 700 into a predetermined position by a programmable controller 100. The programmable controller 100 includes a central processing unit (CPU) 5, a sequence operation processing unit 6 and a process input/output data storage memory (PIO memory) 7 and is connected through a process input/output device (PIO) 200 to a motor 400 to drive a belt conveyor 300, a switch 600, a sensor 500 and so on.

The CPU 5 mainly controls the whole of the programmable controller 100 to make the management or control of the processing unit 6 and the memory 7, the execution of a communication program, and the execution of a word operation processing, etc. The sequence operation processing unit 6 executes a machine instruction program described in accordance with a predetermined procedure Such as a ladder language. The data memory (PIO memory) 7 stores taken-in data of ON/OFF states of the process sides 400, 500 and 600 necessary for the operation of the sequence operation processing unit 6 and process command values which are the results of operation of the sequence operation processing unit 6.

Figure 1:
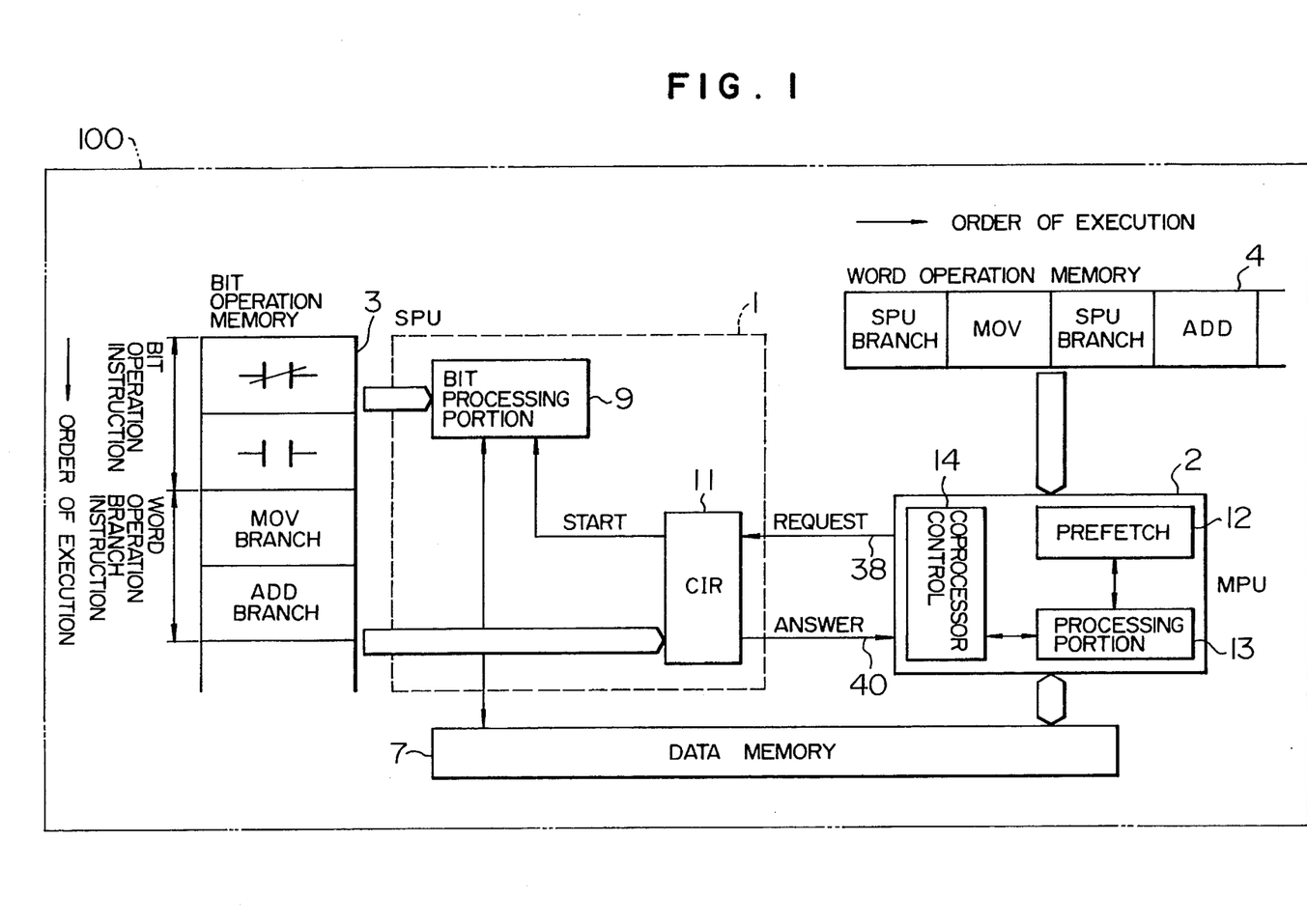
FIG. 1 is a block diagram showing the construction of an embodiment of the present invention.

FIG. 1 shows an embodiment of the programmable controller 100 of the present invention, or more particularly, the detailed construction of the sequence operation processing unit 6. The sequence operation processing unit 6 is composed of a bit operation processor unit (SPU) 1 for executing a bit operation instruction, a general purpose microprocessor unit (MPU) 2 for processing a word operation instruction, a bit operation memory 3 for storing bit operation instructions and word operation branch instructions in order of execution, and a word operation memory 4 for storing bit operation branch instructions and object codes of word operation instructions in order of execution.

The SPU 1 includes a bit operation processing portion 9 for exclusively processing a bit operation instruction, and a coprocessor interface register (CIR) 11, that is, switching means for responding to the recognition of a branch instruction by the processing portion 9 to give a word operation start command to the MPU 2 and for responding to the recognition of a branch instruction by the MPU 2 to stop a processing portion 13 of the MPU 2 (or to stop the stepping of a stored program type program counter) and to start a bit operation.

The general purpose MPU 2 includes an instruction prefetch portion 12 for prefetching a word operation instruction from the memory 4, the processing portion 13 for successively executing the prefetched instruction, and a coprocessor control portion 14 for waiting for an answer from the CIR 11 during stoppage of the processing portion 13 to activate the processing portion 13 as soon as the answer is outputted. The instruction prefetch portion 12 is provided with an instruction cache or the like (not shown) for prefetching the next instruction and the next but one instruction from the memory 4 in parallel with the execution by the processing portion 13.

Data transfer between the SPU 1 or the MPU 2 and a data memory (PIO memory) 7 is made through a signal line or a bus. The MPU 2 may also serve as the CPU 5 shown in FIG. 3(A).

Figure 2:
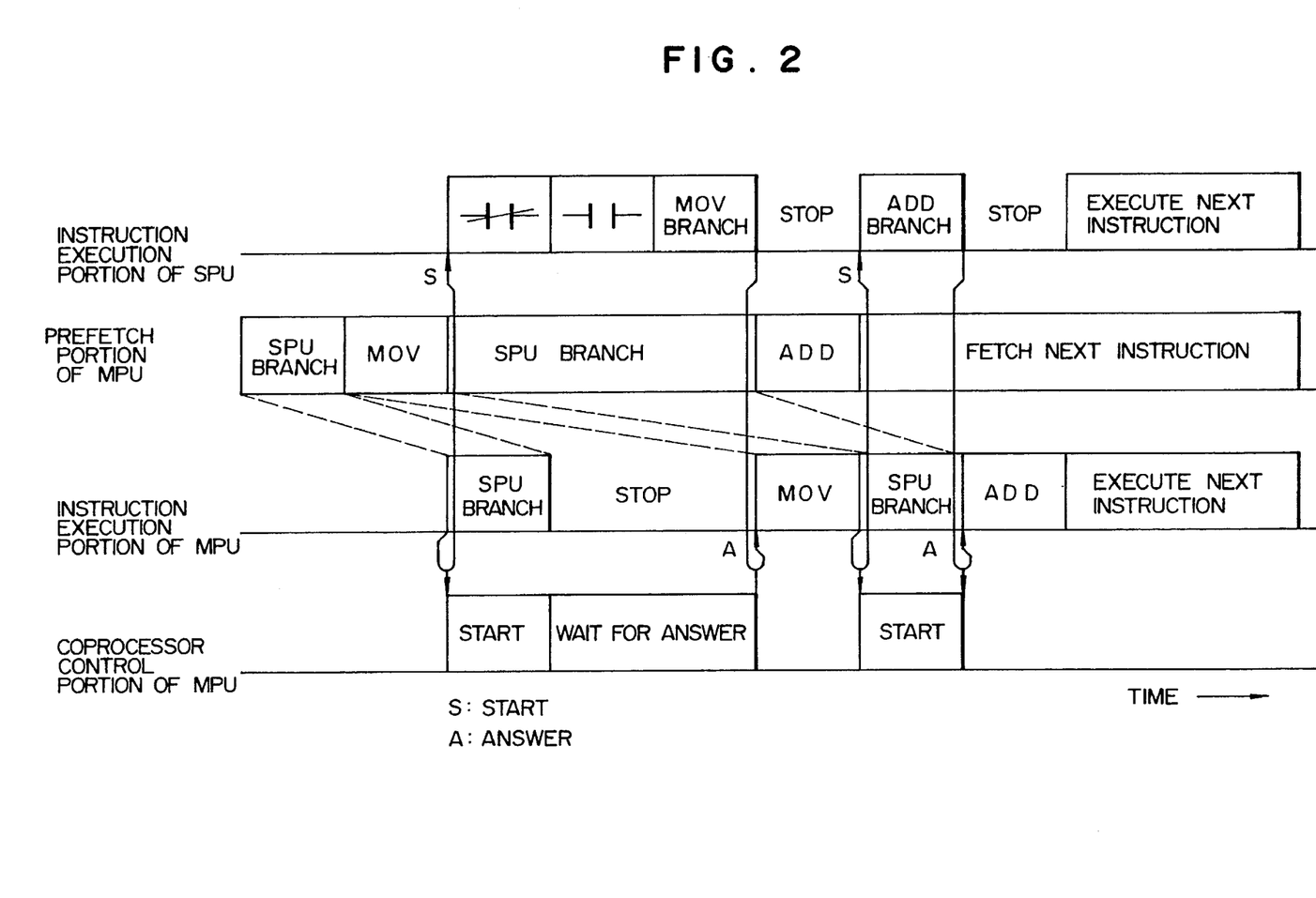
FIG. 2 is a time chart showing the operation of the embodiment of the present invention.

The programmable controller 100 of the present embodiment is thus constructed and operates along a time chart shown in FIG. 2. SPU branch, MOV, SPU branch and ADD instructions beforehand compiled and stored in the order of execution have been prefetched from the storage memory 4 by the MPU 2 prior to the execution of those instructions. When the processing portion 13 of the MPU 2 executes the SPU branch, a request signal 38 for requesting the SPU 1 to execute the next instruction is outputted through the coprocessor control portion 14 and a start S signal for the bit operation processing portion 9 is generated by the setting of the request signal 38. The bit processing portion 9 having been stopped is activated by the start signal S to successively read a b contact instruction and an a contact instruction, which are bit operation instructions, from the memory 3 and to execute the read instructions. During this time, the processing portion 13 of the MPU 2 is stopped and the coprocessor control portion 14 continues to wait for an answer.

When the bit processing portion 9 of the SPU 1 in an executing condition recognizes an MPU branch (word operation instruction), for example, an MOV branch, the CIR 11 converts the MOV branch into a start command for word operation and outputs it as an answer signal A 40 to the MPU 2. At this time, the processing portion 9 is stopped (or the stepping of the program counter is stopped).

When receiving the answer signal A, the MPU 2 executes the word operation instruction MOV to make data transfer between the MPU 2 and the data memory 7. An SPU branch is thereafter executed. Then, through the above-mentioned process, the SPU 1 recognizes an ADD branch and outputs an answer signal A. Then, the MPU 2 executes the ADD instruction by the processing portion 13. The instruction prefetch portion 12 prefetches the next instruction the next but one instruction in parallel with the processing of the ADD instruction by the MPU 2.

Figure 4:
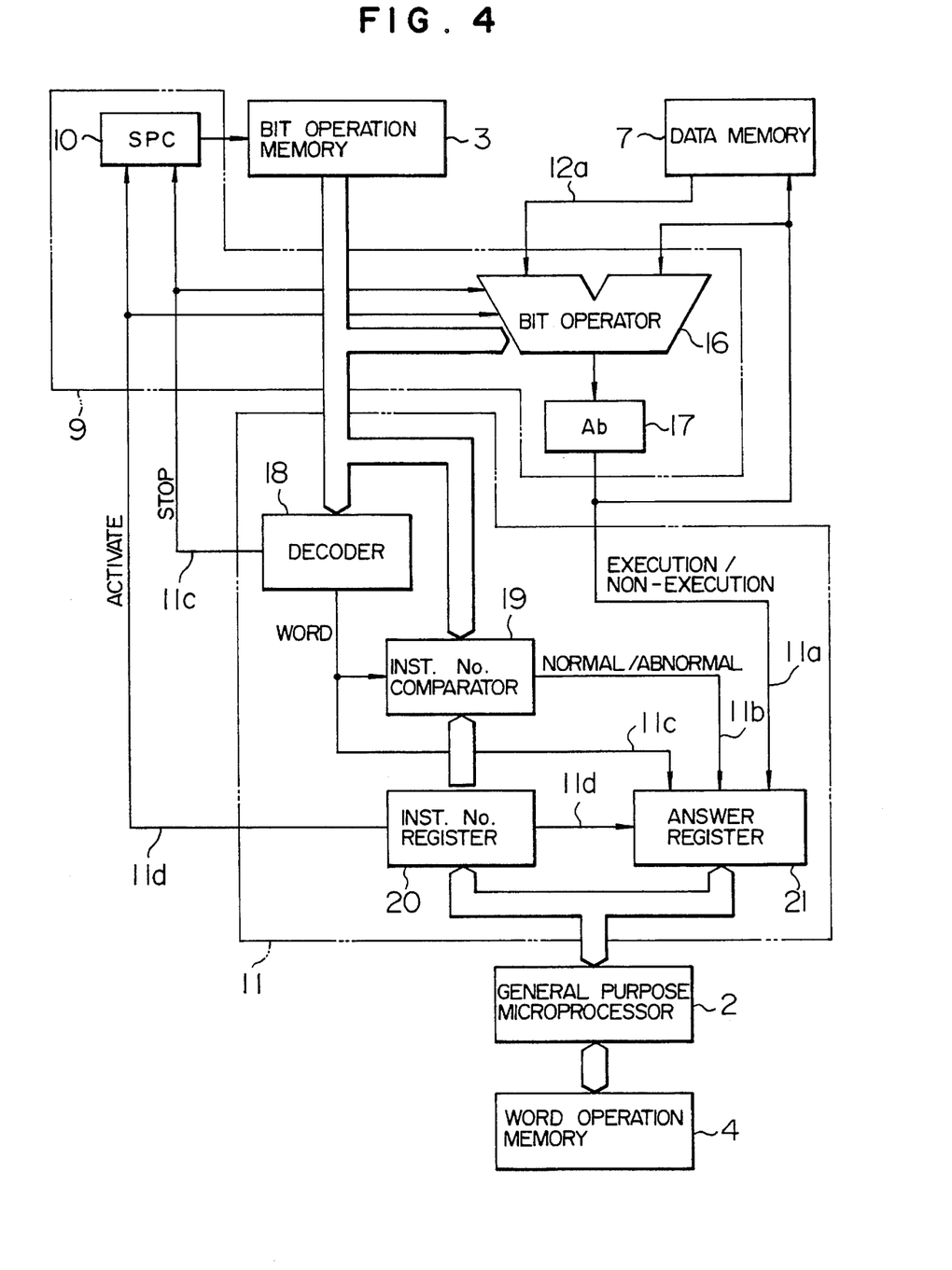
FIG. 4 is a block diagram showing the details of a bit operation processing unit (SPU)

FIG. 4 shows the detailed construction of the coprocessor interface register (CIR) 11 and the bit operation processing portion 9 of the SPU 1. The CIR 11 is composed of a decoder 18 for interpreting the contents of an MPU branch instruction (see FIG. 5), an INST No. comparator 19, an INST No. register 20 and an answer register 21. The bit operation processing portion 9 is composed of a sequence program counter (SPC) 10, an operator 16 and an accumulator 17.

Figure 5A:
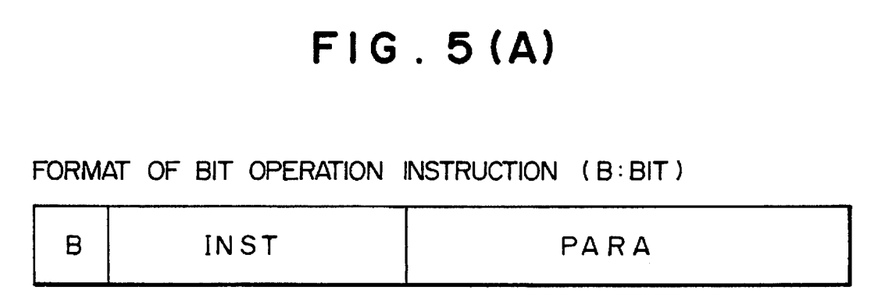
FIGS. 5(A) and 5(B) are conceptual diagrams illustrating the formats of a bit operation instruction and a word operation instruction.

FIG. 5(A) shows the instruction format of bit operation. The bit operation instruction is composed of an operation classification code B indicative of bit operation, an instruction code INST indicative of the kind of instruction, and a parameter PARA indicative of an address of the data memory 7.

Figure 5B:
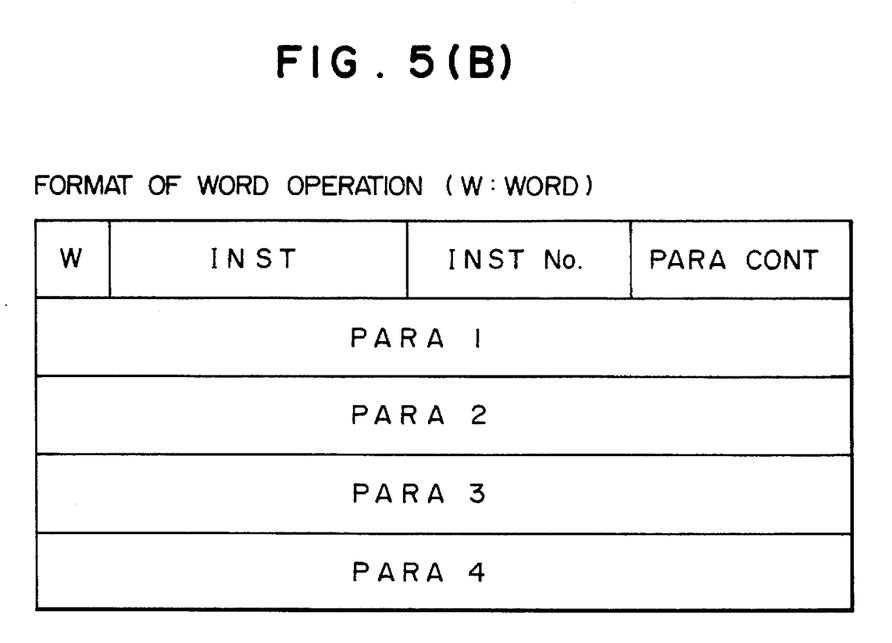

FIG. 5(B) shows the instruction format of word operation. The word operation instruction is composed of an operation classification code W and an instruction code INST which are followed by INST No. indicative of a consecutive number for a plurality of word operation instructions, PARA CONT indicative of access information of a plurality of parameters, and PARA1, PARA2,—arranged in accordance with the PARA CONT. The PARA may be an address of the data memory 7 or data itself. The number of PARA's (0 if there is no PARA) is set to the PARA CONT. The INST No. is used for checking whether or not MPU branches of the bit operation memory 3 and SPU branches of the word operation memory 4 are executed alternately in due order of execution.

In FIGS. 1 and 4, the mixture of bit operation instructions and MPU branch instructions (or a mixed instruction) is stored in the bit operation memory 3, in accordance with the format shown in FIG. 5, in order of execution. Object codes of the MPU 2 corresponding to the MPU branch instructions are stored in the word operation memory 4 in order of execution.

FIG. 2 shows a time chart showing the operation of the SPU 1 and the MPU 2 in FIG. 4. Now assume that the memories 3 and 4 are in their stored conditions as shown in FIG. 1. After having executing the 1st word operation instruction MOV, the processing portion 13 of the MPU 2 activates the coprocessor control portion 14 by an SPU branch instruction. The MPU 2 sets, a request for execution of the 2nd instruction ADD with the designation of the next word operation instruction as the 2nd one, into the INST No. register 20 of the CIR 11 through the coprocessor control portion 14. A start signal S (11d in FIG. 4) for the SPU is outputted by the above setting. Thereafter, the coprocessor control portion 14 stops the processing portion 13 and searches the answer register 21 at every several-hundred nanoseconds as an answer wait processing.

On the other hand, the bit operation processing portion 10 having been stopped subsequently to the recognition of the 1st word operation instruction MOV branch is activated by the start signal S (which is also a reset signal for the register 21) so that the bit operator 16 reads an instruction from an address of the memory 3 designated by the SPC 9 to perform an operation thereon. When the bit operation processing portion 9 in an executing condition recognizes a word operation instruction from the operation classification code (B/W), the bit operation processing portion 9 delivers a word operation instruction execution signal 11a, which is an output of the accumulator (Ab) 17, to the answer register 21 and stops the bit operation processing. When Ab=0 (true), the execution signal 11a causes the execution of a word operation instruction corresponding to the recognized word operation branch instruction. On the other hand, when Ab≠0 (false), the execution signal 11a causes a jump to the next instruction (or the stepping of a program pointer of the execution portion 13 of the MPU to the next instruction). The execution/non-execution of the corresponding word operation instruction based on the result of bit operation (true/false) is controlled by this branch instruction.

The CIR 11 reads an MPU branch instruction ADD branch from the memory 3 at the same timing as the bit operation processing portion 9. The read ADD branch is sent to the answer register 21 after translation by the instruction decoder 18 into a word operation start command 11c which can be interpreted by the MPU 2. This signal becomes the above-mentioned answer signal A 40. Further, the INST No. (2nd) of the ADD branch instruction from decoder 18 and the INST No. (2nd) set in the register 20 from the MPU 2 are compared by the comparator 19 and the result 11b of judgement is outputted to the answer register 21. When both the INST Nos. do coincide with each other, the signal 11b outputs abnormality to interrupt the operation processing. The answer register 21 becomes answerable when the signals 11a to 11c are set.

Even if the MPU 2 is in a stopped condition, the coprocessor control portion 14 continues the search of the answer register 21. When the answer of the word operation start command 11c is made, the coprocessor control portion 14 activates the processing portion 13 which in turn reads the word operation instruction ADD from the word operation memory 4 and performs an operation thereon. In this case, if the MPU 2 is of a prefetch type, the ADD has been prefetched by the prefetch portion 12, as shown in FIG. 2 and hence the ADD operation is performed immediately after the start command is received. Thereby, overhead upon switching is greatly reduced.

By the way, when the MPU 68083 (trade name of Motorola Semiconductors) is employed in the present embodiment, a time required from the recognition of MOV branch by the SPU until the activation of the MPU (or a switching time) is 0.3 to 0.5 µs and a processing time for one word operation amounts to about 1 µs. Thus, the processing time for one word operation is shortened to about ½ to ⅓ of the processing time in the conventional controller and a processing with more higher speed can be expected as the percentage of word operation is increased.

In the above embodiment, a system is employed in which an SPU branch is executed each time the MPU 2 completes a word operation instruction. However, there may be employed a system in which a plurality of word operation instructions are collected into one word operation group and a word block branch instruction is executed in units of one word operation group.

Figure 6:
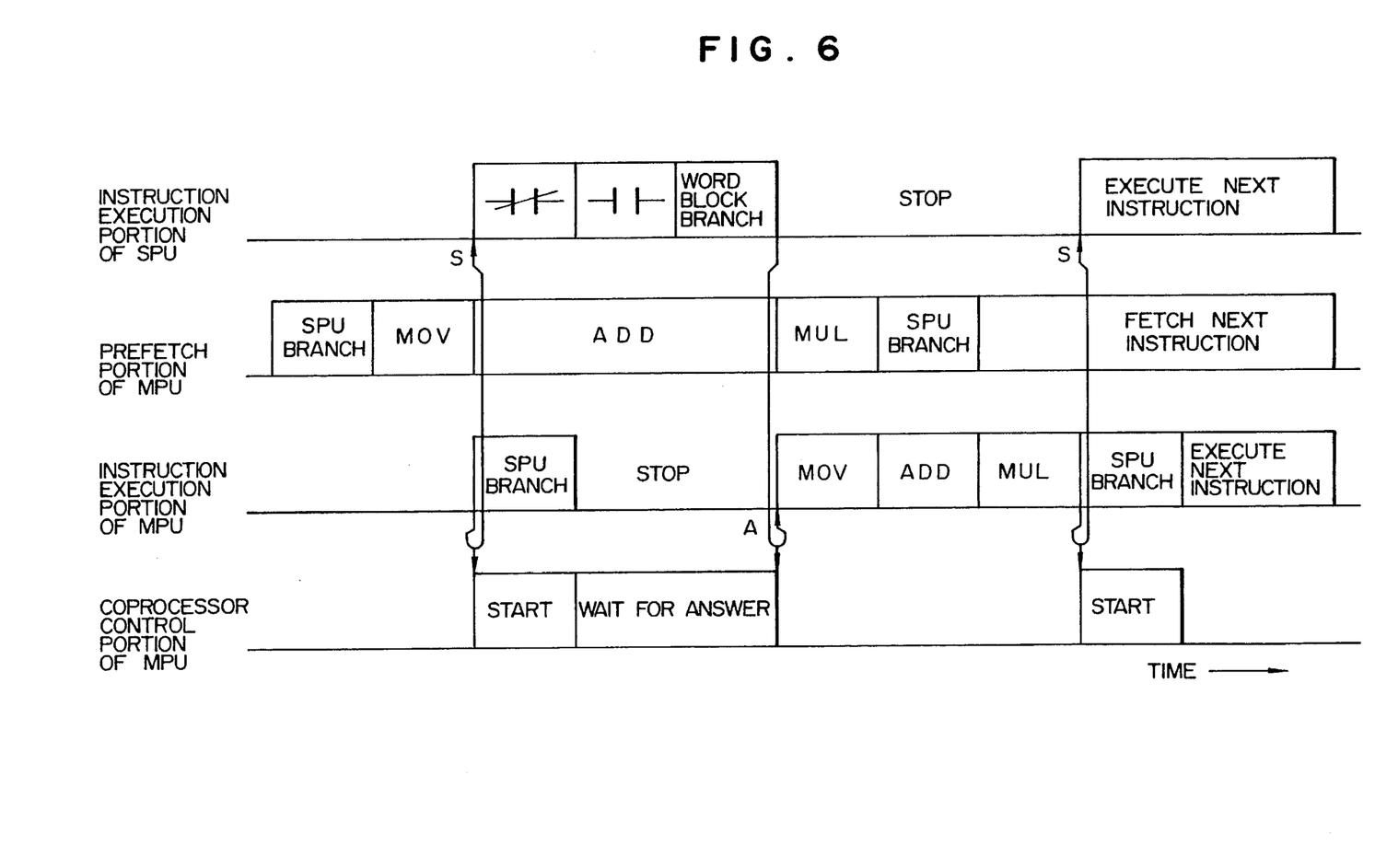
FIG. 6 is a time chart showing a different operation of the embodiment of the present invention.

FIG. 6 shows such an embodiment in which a continuous operation on word operation instructions MOV, ADD and MUL continuously stored in the word operation memory 4 is performed with no branch. With this construction in the shown example, three word operation instructions including MOV, ADD and MUL can be executed in a time when two word operation instructions including MOV and ADD and SPU branch therebetween are executed in the example shown in FIG. 2. As a result, overhead upon operation switching is further reduced.

In the conventional switching system in which no coprocessor interface register (CIR) is used as switching means, for example, in a system in which an MPU forms a self-loop during bit operation to execute a dummy instruction or the like, a jump to a subroutine corresponding to each word operation must be made upon execution by the MPU. Accordingly, if a prefetch type MPU is used, the MPU prefetches upon prefetch the jump instruction as well as an unnecessary instruction in the word memory 4 subsequent to the jump instruction. Further, when the jump instruction is to be actually executed, the MPU prefetches the jump instruction as well as an instruction to which the jump is to be made. Such useless prefetch and discarded prefetch rather causes an increase in overhead.

However, in the present invention as shown by the above embodiment, the CIR 11 is used for switching to stop the processing portion of the MPU 2 during bit operation and word operation instructions are stored in the word operation memory 4 in order of execution. Therefore, useless prefetch is prevented and there is no prefetch to be discarded. As a result, it is possible to make the sufficient use of the merits of the prefetch type general purpose MPU.

Figure 7:
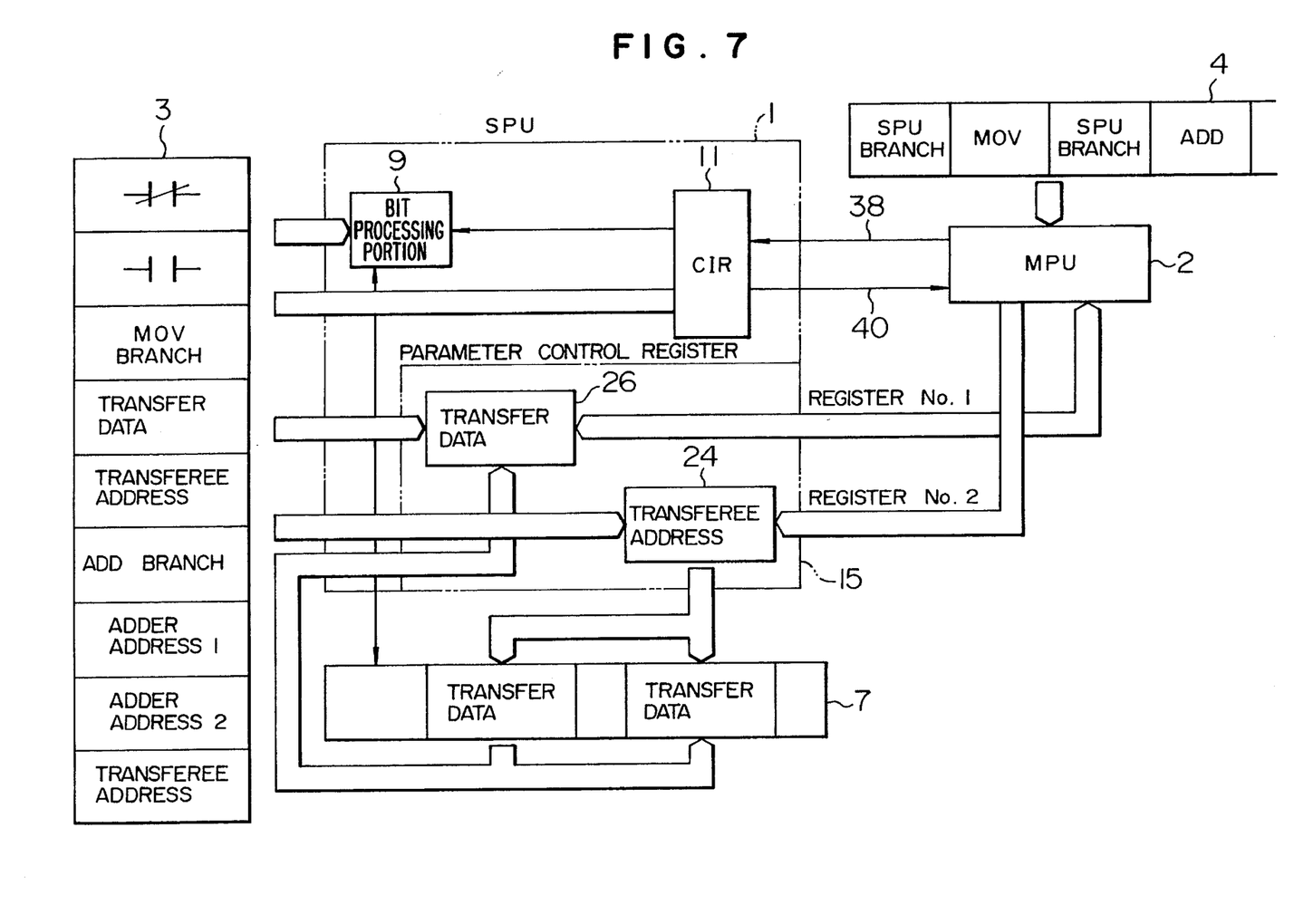
FIG. 7 is a block diagram showing the construction of another embodiment of the present invention.

FIG. 7 shows another embodiment of the present invention which is different from the construction of FIG. 1 in or characterized in that a bit operation processor (SPU) 1 is provided with a parameter control register 15. The parameter control register 15 has address buffers 26 and 24 for index-modifying transferrer data and transferee address, respectively. As addresses PARA of MPU branch instructions stored in a bit operation memory 3, a transferrer data (a) and a transferee address (b) are stored following an MOV branch, and an adder address 1 (c), an adder address 2 (d) and a transferee address (e) are stored following an ADD branch.

Figure 8:
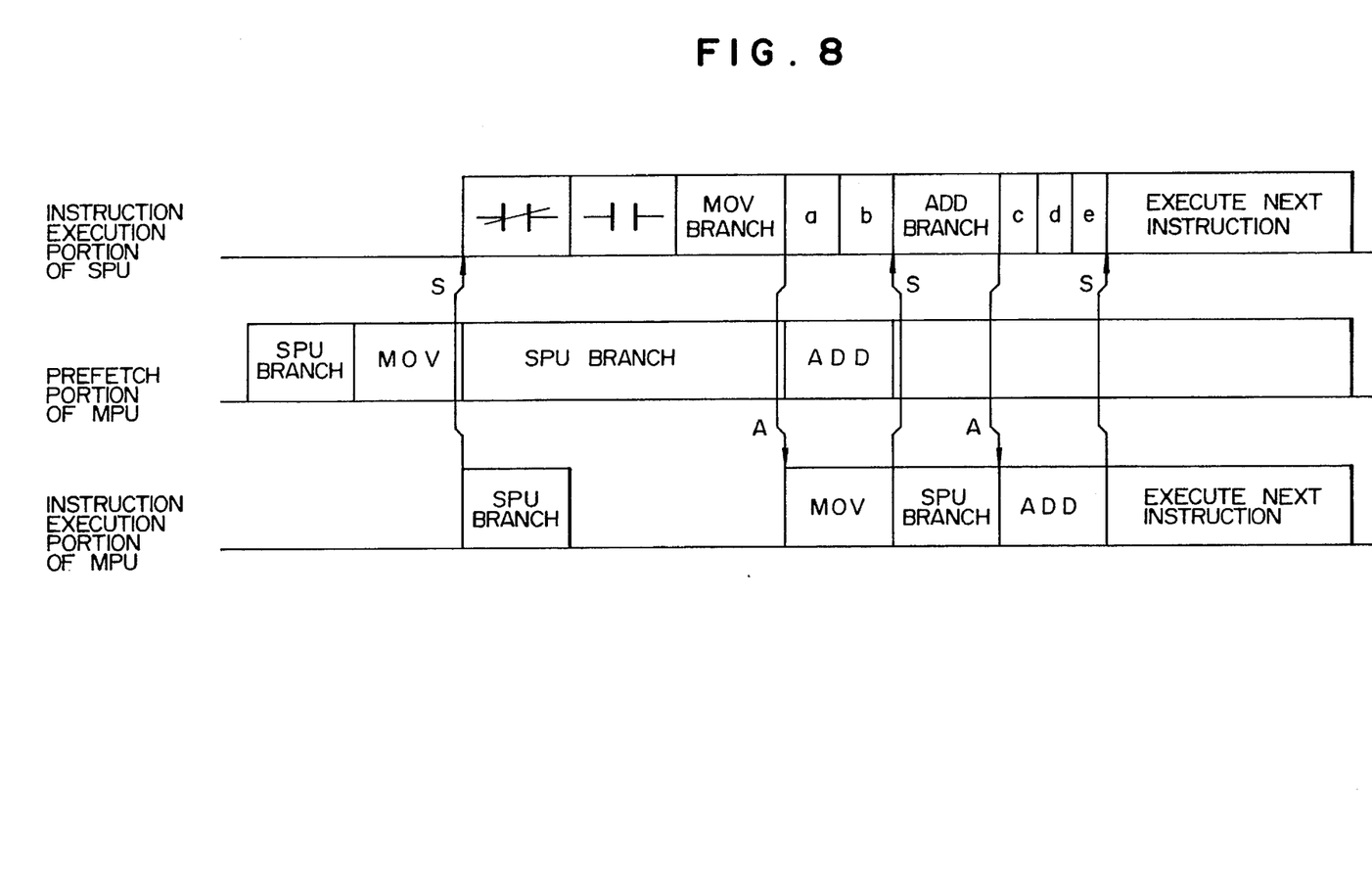
FIG. 8 is a time chart showing the operation of the other embodiment of the present invention.

With such a construction, when an SPU 1 recognizes an MOV branch, the SPU 1 outputs an MOV start command A to an MPU 2 through a CIR 11 on one hand. On the other hand, the SPU 1 stores transferrer data of a data memory 7 into a register No. 1 of the parameter control register 15 which stores immediate data (see a in FIG. 8), and outputs a transferee address to a register No. 2 which stores the transferee address of the data memory 7 (see b in FIG. 8). The MPU 2 takes in data of the register No. 1 to execute an MOV (transfer) instruction and outputs data to the transferee address of the register No. 2. Since the register No. 1 and the register No. 2 are fixed in address, the addresses thereof when seen from the MPU 2 are always the same.

When the SPU 1 recognizes the next instruction or an ADD branch, the SPU1 outputs an ADD start command to the MPU 2 through the CIR 11 on one hand. On the other hand, the SPU 1 outputs adder addresses 1 and 2 through the register No. 2 to the data memory 7 in accordance with the order of access by the MPU and takes in data (see c and d in FIG. 8). The SPU 1 further writes data through the register No. 2 (see e in FIG. 8).

Figure 9:
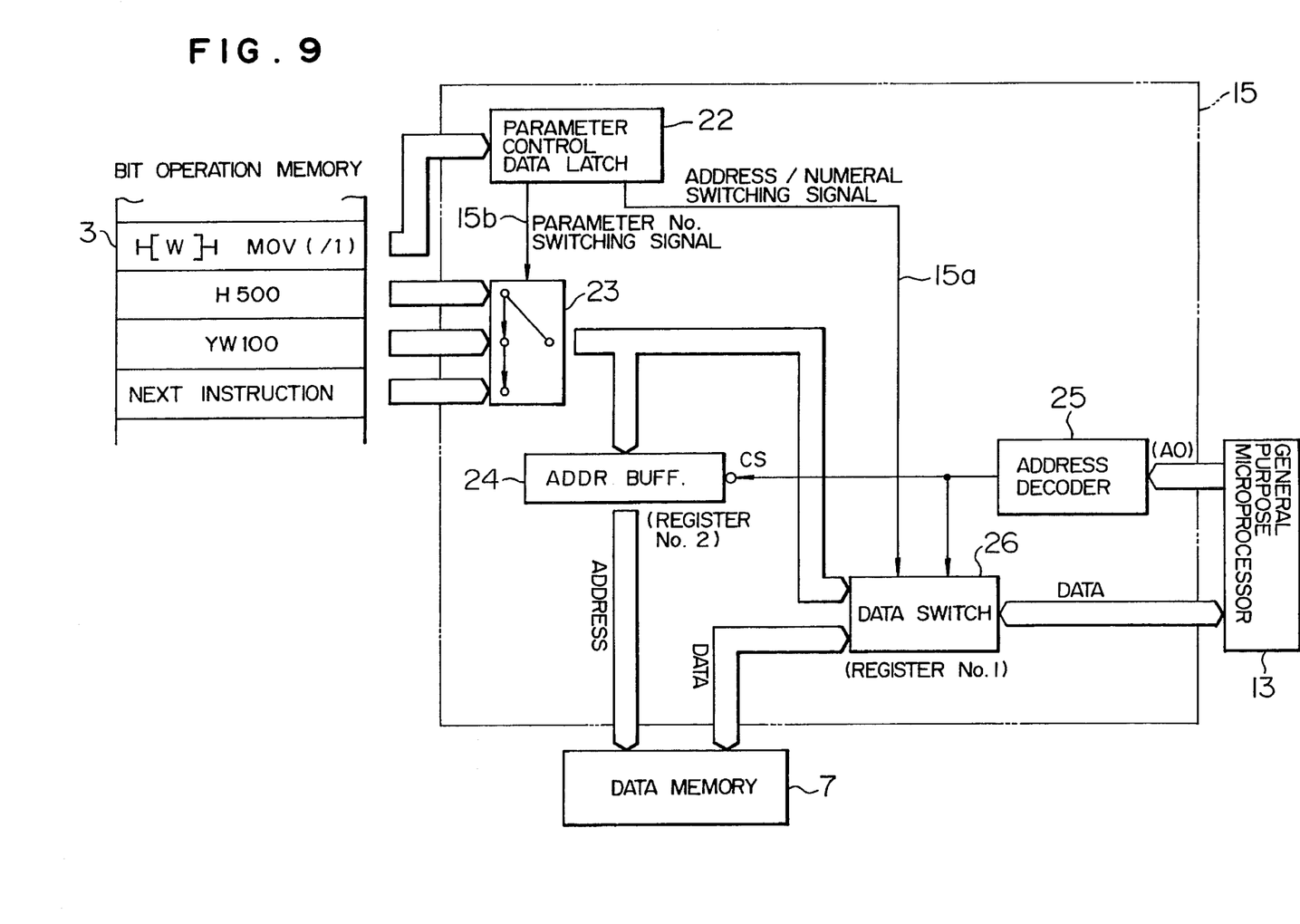
FIG. 9 is a block diagram showing the details of a parameter control register.

FIG. 9 shows the detailed construction of the parameter control register 15. The parameter control register 15 includes a parameter control data latch 22, a parameter switch 23, an address buffer 24, an address decoder 25 and a data switch 26. With this parameter control register 15, a word operation processing can be performed with no parameter being decoded by the MPU 2. The data switch 23 and the address buffer 24 correspond to the above-mentioned register No. 1 and the above-mentioned register No. 2, respectively.

In this construction, when the SPU 1 recognizes a word operation instruction MOV (see FIG. 9), the SPU 1 sets the PARA CONT into the data latch 22. (The number of parameters in the PARA CONT is 2.) When a word operation execution signal 11a is set into the answer register 21 of the CIR 11 from the bit operation processing portion 10, the address decoder 25 starts the decoding of parameters. The data latch 22 supplies a switching No. signal 15b indicative of the number of remaining parameters to the parameter switch 23. The switch 23 first designates immediate data H500.

When receiving an MOV operation start command, the MPU executes an object "MOVE (A0), D0" in the word operation memory 4. A0 is an index-modified version of an address of the parameter control 15, and D0 is an address of an accumulator or the like of the MPU 3. Since an address/numeral switching signal 15a indicates numeral and the data switch 26 designates the parameter switch 23 side, the MPU 2 receives a parameter 500 of the bit operation memory 3 as data (of the address A0) of the parameter control 15 through the data switch 26 and stores it into D0.

Next, the number of remaining parameters is set to 1 so that the parameter switch 23 designates YW100. YW100, which is an address, is set into the address buffer 24 so that the address of the data memory 7 designates YW100. The MPU 2 executes "MOVE D0, (A0)". The data switch 26 designates the data memory 7, and the MPU 2 outputs data of D0 to the address YW100 of the data memory 7 through the parameter control 15 (A0).

Finally, the number 0 of remaining parameters is given to the parameter switch 23 by a signal 15b which in turn designates the next operation command. The parameter switch 23 can also serve as the SPC 10.

As mentioned above, with the parameter control register in the present embodiment, transferrer data and transferee address are index-modified and are always fixed when seen from the MPU side. Accordingly, an address take-in time of the MPU can be reduced and an execution time is greatly shortened in a system which has a large scale address space. By the way, in the case where the MPU 68030 is used, word operation is realized with a time not longer than 1.0 μs.

Further, if the parameter control data latch 22 and the parameter switch 23 are constructed such that they recognize a word operation instruction with the precedence of one instruction to decode parameters, a word operation instruction recognizing time can be made apparently zero, thereby allowing a further improved speed.

Figure 10:
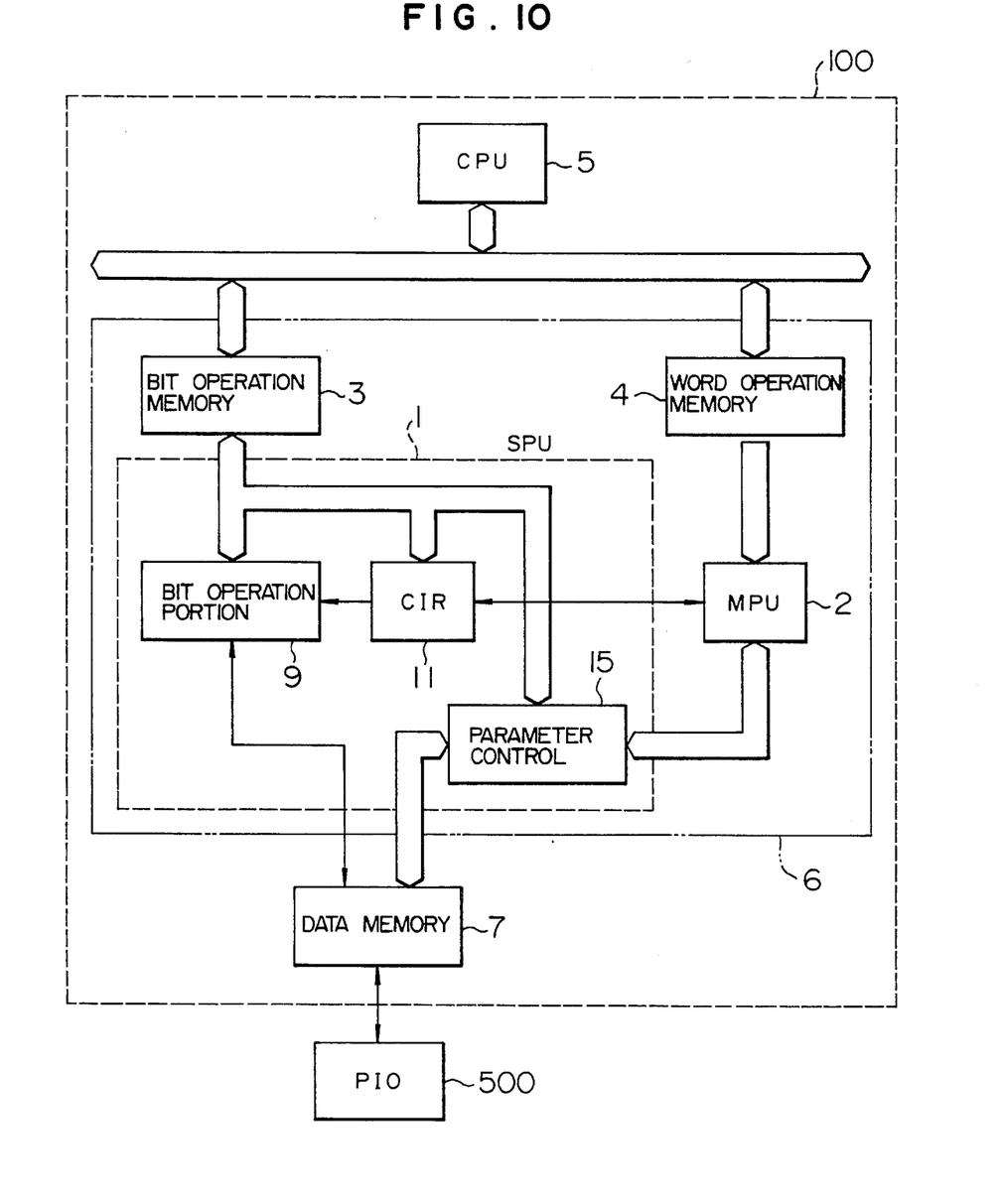
FIG. 10 is a block diagram showing the construction of a further embodiment of the present invention.

FIG. 10 shows a programmable controller obtained by the combination of the above embodiments. A sequence operation processing unit 6 includes an SPU 1, a prefetch type general purpose MPU 2, a CIR 11 for making switching in order of program while taking synchronization between the SPU 1 and the MPU 2, and a parameter control 15 for index-modifying addresses from the MPU 2 side. The sequence operation processing unit further includes an additional processor CPU 5 for processing of communication management, task management, and so on.

According to this programmable controller, since the MPU 2 exclusively processes word operation while prefetching instructions and overhead upon switching is greatly reduced by virtue of the coupling with the CIR and the parameter control, a program including a bit/word mixed instruction can be executed at a speed equivalent to that in a programmable controller constructed by dedicated hardware.

Next, explanation will be made of an embodiment in which the programmable controller of the present invention as explained above is applied to the conveyance control shown in FIG. 3.

Referring to FIG. 3(a), when the switch 600 is turned on by an operator or an external signal, the programmable controller 100 activates and accelerates the motor 400 to drive the conveyor 300, thereby moving the box 700 in a direction toward the sensor 500. When an end portion of the box 700 reaches a position at which the box 700 is detected by the sensor 500, the controller 100 receiving this detection signal decelerates and stops the motor 400 so that the box 700 is stopped at a predetermined position. In the present example, the box 700 is stopped so that the center of the box 700 is positioned just below the sensor (½L).

Figure 3B:
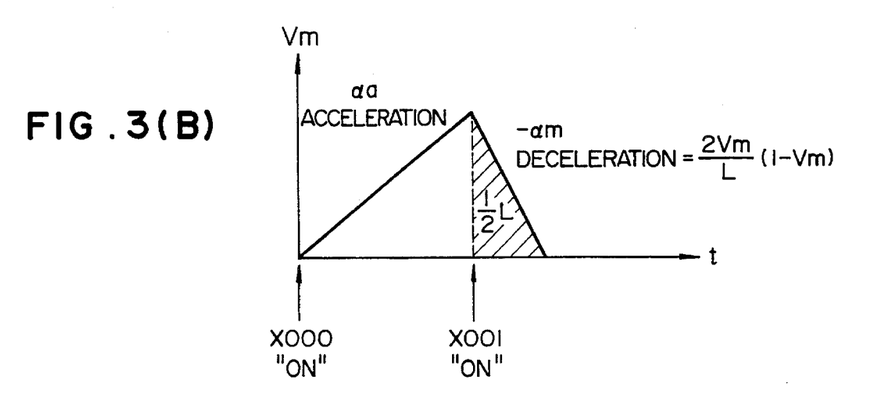
FIG. 3(B) is a diagram showing the change of the motor speed.

A motor activation/acceleration and deceleration/stop control shown in FIG. 3(b) is made by a control program beforehand stored in the sequence operation processing unit 6 and an operation on process input data taken in the PIO memory 7. In order to position the box 700 just below the sensor 500 at high speed and with high accuracy, it becomes necessary to take in the speed of the motor 400 (analog quantity) in cooperation with a bit operation for processing of ON/OFF of the switch 600, etc. and to word-operate (or numerically operate) the deceleration $\alpha_m$ at high speed.

Figure 11:
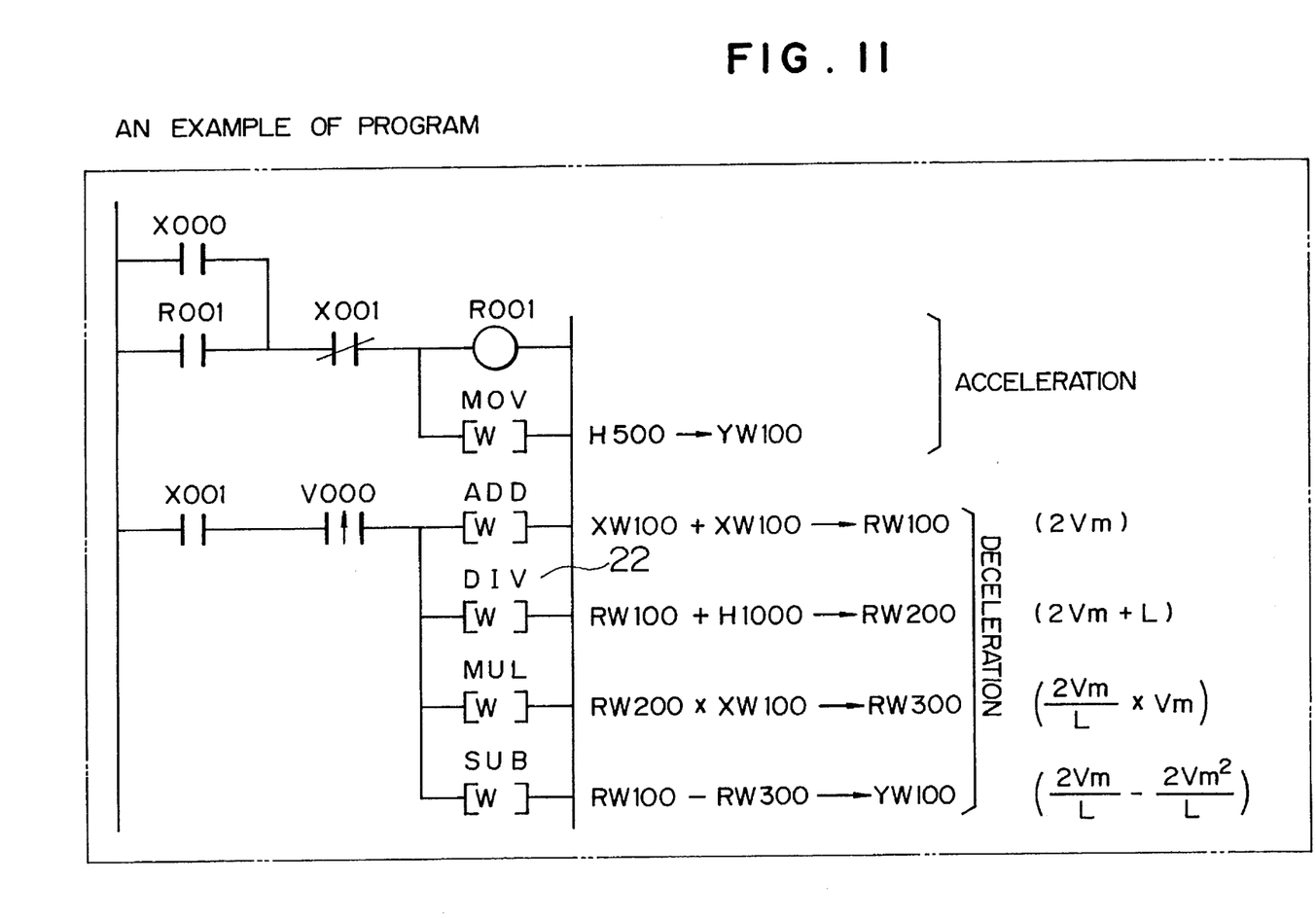
FIG. 11 is a ladder program diagram showing an example of application of the present invention.

FIG. 11 shows a program in which the above control is described by a ladder language. In the figure, contact symbols and coil symbols represent bit operation instructions, and symbols (w)-represent word operation instructions. X000, X001, R000, R001 and V000 are bit addresses of the data memory 7, and XW100, YW100, RW100, RW200 and RW300 are word addresses of the data memory 7.

An a contact of X000 address is turned on by ON of the switch 600. A b contact of X001 address is maintained at its ON condition until the sensor 500 detects the box 700. A coil of R001 is magnetized by ON of X000 so that its a contact is turned on and is self-held. The both a contacts of X000 and R001 have an OR relation therebetween and the motor 400 is activated by ON of X000.

Next, (w)—MOV H500→Yw100 shows a word operation instruction of MOV (transfer). By this instruction, data of H500, which is a predetermined acceleration $\alpha_m$, is stored into address Yw100 of the data memory 7 and the motor 400 is activated and accelerated with the application of a voltage corresponding to this acceleration. The speed $V_m$ of the motor 400 after activation is detected by a speed sensor (not shown) and is stored into XW100 address of the data memory 7. When the sensor 500 detects the end portion of the box 700, the b contact of X001 is turned off to stop the acceleration of the motor 400.

On the other hand, since the a contact of X001 is turned on, the programmable controller 100 calculates (or word-operates) the deceleration $\alpha_m$ in accordance with the following equation 1 so that the box 700 is stopped at a position moved therefrom by L/2, and applies a deceleration voltage for attaining the deceleration to the motor 400 (actually, to an output amplifier with motor incorporated therein):

$$\alpha_m = 2V_m (1-V_m)/L \quad (1)$$

where $V_m$ is the motor speed and L is the length of the box 700. The equation 1 is word-operated as follows:

(2$V_m$): (w)—ADD XW100+XW100→RW100

(2$V_m$÷L): (w)—ADD RW100+H1000→RW200

(2$V_m^2$/L): (w)—MUL RW200×XW100→RW300

(2$V_m$/L−2$V_m^2$/L): (w)—SUB RW100—RW300→ YW300

As the above bit/word operation mixed instruction is processed at higher speed, the accuracy of positioning of the box 700 is improved.

Figure 12:
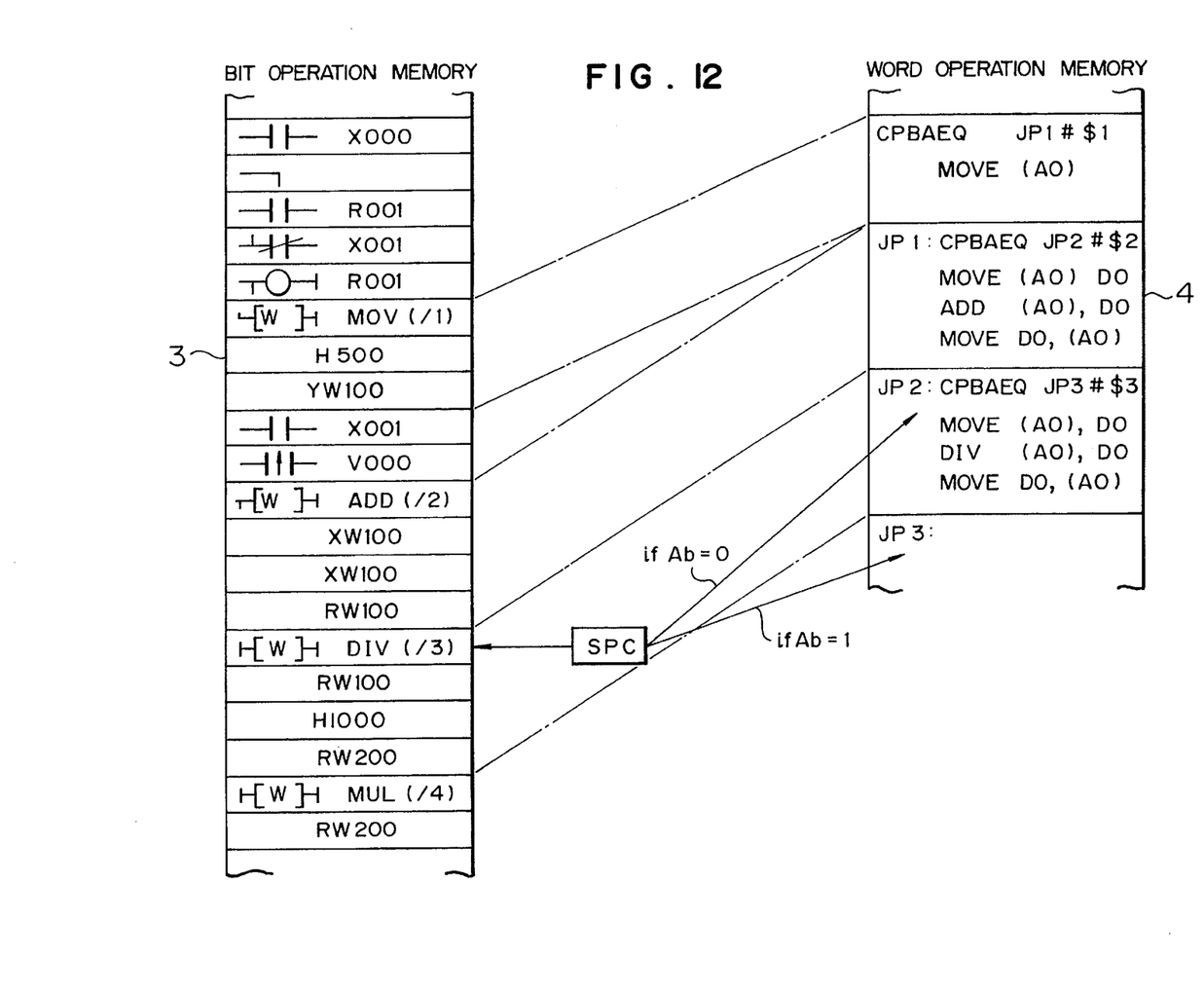
FIG. 12 is a diagram illustrating the state of storage of operation instructions in the example of application.

FIG. 12 shows the state of storage of the above program. A mixed instruction following the format shown in FIG. 5 and the object codes of word operation instructions are respectively stored in the bit operation memory 4 and the word operation memory 4 in order of execution. For example, as for a word operation instruction DIV, INST No.=3 (/3), PARA CONT=3, PARA's 1 to 3 (RW100, H1000, RW200) are stored in the bit operation memory 3. The DIV instruction of the word operation memory 4 is stored at INST No.=3 (#$3) with an object code which is a machine language.

Next, explanation will be made of processings by the SPU 1 and the MPU 2 in this conveyance control. Now assume that the MPU 2 has completed the execution of the 2nd word operation instruction ADD. After completion of ADD, the MPU 2 sets a request for execution of the 3rd word operation instruction DIV with the designation of this word operation instruction as the 3rd one into the INST No. register 20 of the CIR 11. This instruction is "CPBAEQ JP3 #$3" stored in the word operation memory 4. Thereafter, the MPU 2 turns into a condition of wait for an answer from the answer register 21.

On the other hand, the bit operation processing portion 9 having been stopped after recognition of the 2nd word operation instruction ADD is activated by a set signal 11d of the register 20 so that the bit operator 16 reads instructions from the bit operation memory 4 in the order designated by the SPC 10 and performs an operation thereon. When the bit operation processing portion 9 in an executing condition recognizes an MPU branch instruction from an operation classification code (B/W), the bit operation processing portion 9 delivers a word operation execution signal 11a through the accumulator 17 of the bit operation processing portion 9. Further, the bit operation processing portion 9 stores data (2V) of RW100 (transferrer address), which is PARA of DIV, into the register No. 1 of the data switch and transferee address RW200 into the register No. 2 of the address buffer, thereby making index-modification by the parameter control register 15. Thereafter, the bit operation processing portion is stopped.

The CIR 11 reads a DIV branch instruction (w)—DIV (/3)) from the memory 3 in parallel with the bit operation processing portion 9 and sets it into the answer register 21 after translation thereof by the decoder 18 into a DIV start command 11c which can be interpreted by the MPU 2. Also, (/3) in the DIV branch instruction and INST No. of the INST No. register 20 are compared with each other by the comparator 19. If coincidence is obtained, the start of word operation by the MPU 2 becomes possible. If coincidence is not obtained, the execution of the program is discontinued.

When receiving the DIV operation start command, the MPU 2 executes "MOVE (A0), D0" which has been prefetched in the instruction prefetch portion 12 at the time of the preceding execution. A0 is an index-modified version of the address of the parameter control 15 and D0 is the address of the accumulator or working memory of the MPU 3. Thereby, the MPU 2 receives data (2$V_m$) of address RW100 of the data memory 7 from the parameter control 15 and stores it into D0.

Next, since an address/numeral switching signal indicates a numeric value, the data switch 26 receives numerical data 1000 from the bit operation memory 3 and the MPU 2 executes "DIV (A0), D0" in the objects and stores the result 2$V_m$/1000 of division of data 2$V_m$ of D0 by 1000 into D0 again.

Finally, the MPU 2 executes "MOVE D0, (A0)" and delivers data 2$V_m$/1000 through the parameter control 15 (A0) to the address RW200 of the data memory 7 which in turn stores the data.

When the DIV operation has been completed, the MPU 2 informs the CIR 11 of a request for execution of the 4th word operation instruction and that this word operation instruction is the 4th one, and is stopped. The SPU 1 resumes bit operation but immediately outputs an MUL start command since the next instruction is an MUL branch of word operation. By this command, the MPU 2 calculates (2$V_m$× $V_m$/L). The 5th word operation SUB is similarly executed to determine deceleration $\alpha_m$ and a voltage controlled to attain this deceleration $\alpha_m$ is applied to the motor 400.

As has been described in the foregoing, the present invention can provide a high-speed programmable controller in which switching between word operation and bit operation is possible with no overhead even if a prefetch type general purpose MPU is used for word operation. Thereby, a real-time processing of a complicated sequence control becomes possible. Also, since the general purpose MPU is used, the development and change of the system can be facilitated.

What is claimed is:

1. A programmable controller comprising:

a bit operation memory for storing a mixture of bit operation instructions and word operation instructions in order of execution;

a word operation memory, separate from said bit operation memory, for storing the word operation instructions in order of execution;

a bit operation processor, connected to said bit operation memory, for outputting a start command for a word operation instruction when a word operation instruction read from said bit operation memory subsequent to the execution of a bit operation instruction is recognized; and a microprocessor, connected to said word operation memory, for receiving said word operation start command to execute a word operation instruction stored in said word operation memory corresponding to said recognized word operation instruction.

2. A programmable controller according to claim 1, wherein said bit operation processor includes switching means for interpreting said recognized word operation instruction and outputting it after conversion into a start command which said microprocessor can process.

3. A programmable controller comprising:

a bit operation memory for storing bit operation instructions and word operation branch instructions in order of execution;

a word operation memory, separate from said bit operation memory, for storing word operation instructions corresponding to said word operation branch instructions and bit operation branch instructions in order of execution;

a bit operation processor, connected to said bit operation memory, for executing bit operations in response to the instructions stored in said bit operation memory;

a microprocessor, connected to said word operation memory, for executing word operations in response to the instructions stored in said word operation memory; and switching means for stopping one of a bit operation or a word operation under execution and starting the other operation in accordance with a word operation branch instruction or a bit operation branch instruction under execution.

4. A programmable controller for executing a control program which includes a mixture of bit operation instructions and word operation instructions, comprising:

a word operation memory for storing said word operation instructions in order of execution;

a bit operation memory, separate from said word operation memory, for storing said bit operation instructions and word operation branch instructions in order of execution;

a microprocessor, connected to said word operation memory, for executing a word operation instruction and outputting, after completion of the execution of said word operation instruction, a request for execution of the next word operation instruction, thereby turning said microprocessor into an answer wait condition;

a bit operation processor, connected to said bit operation memory, activated upon reception of said request for execution of the next word operation instruction for starting the execution of a bit operation instruction; and switching means, responsive to recognition of a word operation branch instruction by said bit operation processor, for outputting an answer signal as a word operation start command to said microprocessor in said answer wait condition.

5. A programmable controller for executing a control program which includes a mixture of bit operation instructions and word operation instructions, comprising:

a bit operation memory for storing said bit operation instructions and word operation branch instructions in order of execution;

a word operation memory, separate from said bit operation memory, for storing object codes of said word operation instructions in order of execution;

a bit operation processor, connected to said bit operation memory, for outputting a word operation start command when a word operation branch instruction has been recognized during execution of said bit operation instructions; and a microprocessor, connected to said word operation memory and, responsive to said word operation start command, for executing the object codes of said word operation instructions, said bit operation processor being provided with address control means for index-modifying a transfer address included in the word operation branch instruction so that said address is fixed when seen from the microprocessor side.

6. A programmable controller according to claim 1, wherein said microprocessor is a prefetch type general purpose microprocessor which is provided with prefetch means for prefetching, the next word operation instruction or a plurality of word operation instructions from the next word operation instruction onward stored in said word operation memory, in parallel with the execution of said word operation instruction.

7. A programmable controller according to claim 2, wherein said microprocessor is a prefetch type general purpose microprocessor which is provided with prefetch means for prefetching, the next word operation instruction or a plurality of word operation instructions from the next word operation instruction onward stored in said word operation memory, in parallel with the execution of said word operation instruction.

8. A programmable controller according to claim 3, wherein said microprocessor is a prefetch type general purpose microprocessor which is provided with prefetch means for prefetching, the next word operation instruction or a plurality of word operation instructions from the next word operation instruction onward stored in said word operation memory, in parallel with the execution of said word operation instruction.

9. A programmable controller according to claim 4, wherein said microprocessor is a prefetch type general purpose microprocessor which is provided with prefetch means for prefetching, the next word operation instruction or a plurality of word operation instructions from the next word operation instruction onward stored in said word operation memory, in parallel with the execution of said word operation instruction.

10. A programmable controller according to claim 5, wherein said microprocessor is a prefetch type general purpose microprocessor which is provided with prefetch means for prefetching, the next word operation instruction or a plurality of word operation instructions from the next word operation instruction onward stored in said word operation memory, in parallel with the execution of said word operation instruction.

11. A sequence control method for processing a program inclusive of a mixture of a bit operation instruction based on a ladder instruction language and a word operation instruction based on a general purpose computer language by use of a bit operation processor connected to a bit operation memory for storing bit operation instructions and word operation branch instructions in order of execution and a general purpose microprocessor connected to a word operation memory, separate from said bit operation memory, for storing word operation instructions corresponding to said word operation branch instructions in order of execution, comprising the steps of:

recognizing in said bit operation processor a word operation branch instruction during execution of a bit operation instruction based on said ladder instruction language;

converting, when said word operation branch instruction is recognized, in said bit operation processor said word operation branch instruction into a word operation start command based on said general purpose computer language;

starting a processing by said microprocessor in response to said word operation start command; and executing, during said processing started in response to said word operation start command, a word operation instruction based on said general purpose computer language and corresponding to said word operation branch instruction.

12. A programmable controller for executing a control program which includes a mixture of bit operation instructions and word operation instructions, comprising:

a word operation memory for storing said word operation instructions and bit operation branch instructions in order of execution;

a bit operation memory, separate from said word operation memory, for storing said bit operation instructions and word operation branch instructions in order of execution;

a microprocessor, connected to said word operation memory for executing a word operation instruction, outputting, after recognition of a bit operation branch instruction, a request for execution of the next word operation instruction, and stopping incrementing of a program counter when the next word operation instruction has been requested, thereby turning said microprocessor into an answer wait condition;

a bit operation processor, connected to said bit operation memory and said microprocessor, activated upon reception of said request for execution of the next word operation instruction for starting the execution of a bit operation instruction; and switching means, responsive to recognition of a word operation branch instruction by said bit operation processor, for outputting an answer signal as a word operation start command to said microprocessor in said answer wait condition.

* * * * *